(12) United States Patent
Hall et al.

(10) Patent No.: US 7,248,177 B2
(45) Date of Patent: Jul. 24, 2007

(54) DOWN HOLE TRANSMISSION SYSTEM

(75) Inventors: David R. Hall, Provo, UT (US); H. Tracy Hall, Jr., Provo, UT (US)

(73) Assignee: IntelliServ, Inc., Provo, UT (US)

( * ) Notice: Subject to any disclaimer, the term of this patent is extended or adjusted under 35 U.S.C. 154(b) by 386 days.

(21) Appl. No.: 10/878,146

(22) Filed: Jun. 28, 2004

(65) Prior Publication Data

US 2005/0285752 A1 Dec. 29, 2005

(51) Int. Cl.
*G01V 3/00* (2006.01)
(52) U.S. Cl. .................. 340/854.8; 340/853.1; 340/854.3; 340/854.7; 340/855.1; 336/130; 324/333
(58) Field of Classification Search ........... 340/854.8, 340/854.6, 853.1, 855.1, 854.7, 854.9; 166/379, 166/65, 117.5, 255.1, 381; 324/333, 339, 324/332, 338; 367/82; 336/130; 73/152.03
See application file for complete search history.

(56) References Cited

U.S. PATENT DOCUMENTS

| | | | |
|---|---|---|---|
| 5,850,369 A | 12/1998 | Rorden et al. | |
| 6,392,317 B1 | 5/2002 | Hall et al. | |
| 6,587,054 B2 * | 7/2003 | Besser et al. | 340/854.9 |
| 6,657,551 B2 | 12/2003 | Huckaba et al. | |
| 6,670,880 B1 | 12/2003 | Hall et al. | |
| 6,717,501 B2 | 4/2004 | Hall et al. | |
| 6,735,633 B1 | 5/2004 | Welch et al. | |
| 6,763,391 B1 | 7/2004 | Ludtke | |
| 6,799,632 B2 | 10/2004 | Hall et al. | |
| 6,815,617 B1 * | 11/2004 | Gebs et al. | 174/113 AS |
| 6,816,456 B1 | 11/2004 | Tse-Au | |
| 6,820,117 B1 | 11/2004 | Johnson | |
| 6,821,147 B1 | 11/2004 | Hall et al. | |
| 6,830,467 B2 | 12/2004 | Hall et al. | |
| 6,842,469 B2 | 1/2005 | Drwiega et al. | |
| 6,844,498 B2 | 1/2005 | Hall et al. | |
| 6,866,306 B2 * | 3/2005 | Boyle et al. | 285/333 |
| 6,888,473 B1 | 5/2005 | Hall et al. | |
| 6,903,660 B2 * | 6/2005 | Clark et al. | 340/854.8 |
| 6,913,093 B2 | 7/2005 | Hall et al. | |
| 6,929,493 B2 | 8/2005 | Hall et al. | |
| 6,931,011 B2 | 8/2005 | Giacopelli et al. | |
| 6,945,802 B2 | 9/2005 | Hall et al. | |
| 7,168,506 B2 * | 1/2007 | Boucher et al. | 175/48 |
| 2002/0193004 A1 * | 12/2002 | Boyle et al. | 439/577 |
| 2003/0169179 A1 * | 9/2003 | James | 340/854.9 |
| 2004/0104797 A1 | 6/2004 | Hall et al. | |

(Continued)

*Primary Examiner*—Jeffery Hofsass
*Assistant Examiner*—Sisay Yacob
(74) *Attorney, Agent, or Firm*—Tyson J. Wilde; Jeffery E. Daly

(57) ABSTRACT

A transmission system in a downhole component comprises a data transmission element in both ends of the downhole component. Each data transmission element houses an electrically conducting coil in a MCEI circular trough. The electrically conducting coil comprises at least two generally fractional loops. In the preferred embodiment, the transmission elements are connected by an electrical conductor. Preferably, the electrical conductor is a coaxial cable. Preferably, the MCEI trough comprises ferrite. In the preferred embodiment, the fractional loops are connected by a connecting cable. In one aspect of the present invention, the connecting cable is a pair of twisted wires. In one embodiment the connecting cable is a shielded pair of twisted wires. In another aspect of the present invention, the connecting cable is a coaxial cable. The connecting cable may be disposed outside of the MCEI circular trough.

21 Claims, 13 Drawing Sheets

U.S. PATENT DOCUMENTS

| | | |
|---|---|---|
| 2004/0113808 A1 | 6/2004 | Hall et al. |
| 2004/0145492 A1 | 7/2004 | Hall et al. |
| 2004/0150532 A1 | 8/2004 | Hall et al. |
| 2004/0164833 A1 | 8/2004 | Hall et al. |
| 2004/0164838 A1 | 8/2004 | Hall et al. |
| 2004/0216847 A1 | 11/2004 | Hall et al. |
| 2004/0244916 A1 | 12/2004 | Hall et al. |
| 2004/0244964 A1 | 12/2004 | Hall et al. |
| 2004/0246142 A1 | 12/2004 | Hall et al. |
| 2005/0001735 A1 | 1/2005 | Hall et al. |
| 2005/0001736 A1 | 1/2005 | Hall et al. |
| 2005/0001738 A1 | 1/2005 | Hall et al. |
| 2005/0035874 A1 | 2/2005 | Hall et al. |
| 2005/0035875 A1 | 2/2005 | Hall et al. |
| 2005/0035876 A1 | 2/2005 | Hall et al. |
| 2005/0036507 A1 | 2/2005 | Hall et al. |
| 2005/0039912 A1 | 2/2005 | Hall et al. |
| 2005/0045339 A1 | 3/2005 | Hall et al. |
| 2005/0046586 A1 | 3/2005 | Hall et al. |
| 2005/0046590 A1 | 3/2005 | Hall et al. |
| 2005/0067159 A1 | 3/2005 | Hall et al. |
| 2005/0070144 A1 | 3/2005 | Hall et al. |
| 2005/0082092 A1 | 4/2005 | Hall et al. |
| 2005/0092499 A1 | 5/2005 | Hall et al. |
| 2005/0093296 A1 | 5/2005 | Hall et al. |
| 2005/0095827 A1 | 5/2005 | Hall et al. |
| 2005/0115717 A1 | 6/2005 | Hall et al. |
| 2005/0118848 A1 | 6/2005 | Hall et al. |
| 2005/0145406 A1 | 7/2005 | Hall et al. |
| 2005/0150653 A1 | 7/2005 | Hall et al. |
| 2005/0161215 A1 | 7/2005 | Hall et al. |
| 2005/0173128 A1 | 8/2005 | Hall et al. |
| 2005/0212530 A1 | 9/2005 | Hall et al. |
| 2005/0230149 A1 * | 10/2005 | Boucher et al. ............... 175/48 |
| 2005/0236160 A1 | 10/2005 | Hall et al. |
| 2006/0151179 A1 * | 7/2006 | Boyadjieff et al. .......... 166/380 |

* cited by examiner

DOWN HOLE TRANSMISSION SYSTEM

FEDERAL SPONSORSHIP

This invention was made with government support under contract number No. DE-FC26-01NT41229 awarded by the Department of Energy. The government has certain rights in this invention.

CROSS REFERENCE TO RELATED APPLICATIONS

None

BACKGROUND

This invention relates to transmission systems in downhole components, more specifically to transmission systems comprising inductive couplers. U.S. Pat. No. 6,670,880, which is incorporated herein by reference, discloses a downhole transmission system through a string of downhole components. A first transmission element is located in one end of each downhole component, which includes a first magnetically-conductive, electrically-insulating (MCEI) trough, and a first electrically conductive coil lying there in. A second data transmission element is located in the other end, with a similar arrangement comprising a second magnetically-conductive, electrically-insulating trough and a second electrically conductive coil. The transmission system further comprises an electrical conductor in electrical communication with and running between each first and second coil in the downhole component. The string of downhole components is cooperatively arranged such that the troughs are in magnetic communication with each other and transmit signals through induction. Each downhole component comprises electrical characteristics such as impedance, reactance, capacitance and inductance.

U.S. Pat. No. 6,586,932 discloses an antenna design for a downhole nuclear magnetic resonance logging tool. The logging tool is enhanced to shape the resultant RF field generated by the antenna. The enhancement is accomplished by adding additional turns to a portion of the antenna, either circumscribing a ferrite material or locating it on the surface of an at least partially non-conductive material. The additional turns or half turns in combination with the RF field from parallel antenna portions result in a RF field contribution from the coil portions which are not enhanced. Further, the total RF field can be shaped over an earth sample region depending on placement of the enhancing turns. In this way, for example, the total RF field can be generated to achieve an orthogonal alignment with a static field over a larger region of the sample.

U.S. Pat. No. 6,586,939 discloses a transverse induction logging tool having a transmitter and receiver for downhole sampling of formation properties. The tool has a symmetrical spilt-coil transmitter coil and a bucking coil interposed between the spilt transmitter coils to reduce coupling of the transmitter time varying magnetic field into the receiver. The tool provides symmetrical shielding of the coils and grounding at either the transmitter or receiver end only to reduce coupling of induced currents into the received signal.

SUMMARY OF THE INVENTION

A transmission system in a downhole component comprises a data transmission element in both ends of the downhole component. Each data transmission element houses an electrically conducting coil in a MCEI circular trough. The electrically conducting coil comprises at least two generally fractional loops. In the preferred embodiment, the transmission elements are connected by an electrical conductor. Disclosed is an electrical conductor that is a coaxial cable.

Disclosed is a transmission element where the MCEI trough comprises ferrite. As a signal travels along the fractional loops a magnetic field is generated in the MCEI trough. When adjacent another transmission element, the magnetic field influences the adjacent MCEI trough to generate a magnetic field. The transmission elements may be arranged such that a magnetic transmission circuit is generated and a signal is created in the adjacent fractional loops of the coil. The at least two fractional loops may be wires. The at least two fractional loops may be insulated wires.

In the preferred embodiment, the fractional loops are connected by a connecting cable. In one aspect of the present invention, the connecting cable is a pair of twisted wires. In some embodiments of the present invention the connecting cable is a shielded pair of twisted wires. It is believed that the electromagnetic influence of the one twisted wire is cancelled out by the other twisted wire and vice versa. It is believed that a shielded pair of twisted wires would improve the shielding of electromagnetic influences from the wires. It is important that the MCEI trough is not influenced by their electromagnetic fields so that a second magnetic field is not magnified. It is believed that a strong second magnetic field would create interference in the transmission of a signal from one downhole component to an adjacent downhole component.

Disclosed is a connecting cable that is disposed outside of the MCEI circular trough. In some embodiments of the present invention, the connecting cable is disposed in a hole in the MCEI trough. Also disclosed is a connecting cable is disposed in a channel formed in the MCEI circular trough. Some embodiments include a connecting cable disposed outside an annular housing, which houses the MCEI circular trough.

In another aspect of the present invention, the connecting cable is a coaxial cable. In some embodiments the connecting cable is a triaxial cable. It is believed that the electromagnetic influence of the inner core of the coaxial cable is cancelled out by the outer shield of the coaxial cable and vice versa. It is believed that a triaxial cable would further shield the MCEI trough from the electromagnetic influences of the inner core and the shield of the coaxial cable. In another aspect of the present invention, the connecting cable is a shielded twin axial cable. In this embodiment, it is believed that the shield protects MCEI trough from the electromagnetic influences of the twin axial cable. The connecting cable may be grounded to the annular housing. In other embodiments the connecting cable is grounded to the downhole component.

The downhole component may be part of a drill string. Alternatively the downhole component may be part of a production well. The downhole component may be a pipe. In some embodiments, the downhole component may be a tool.

It should be understood that in this specification, the term "fractional loop" is intended to mean that the loop resides in 80 percent or less of the length of the MCEI circular trough.

DETAILED DESCRIPTION OF THE PREFERRED EMBODIMENTS

Figure 1:
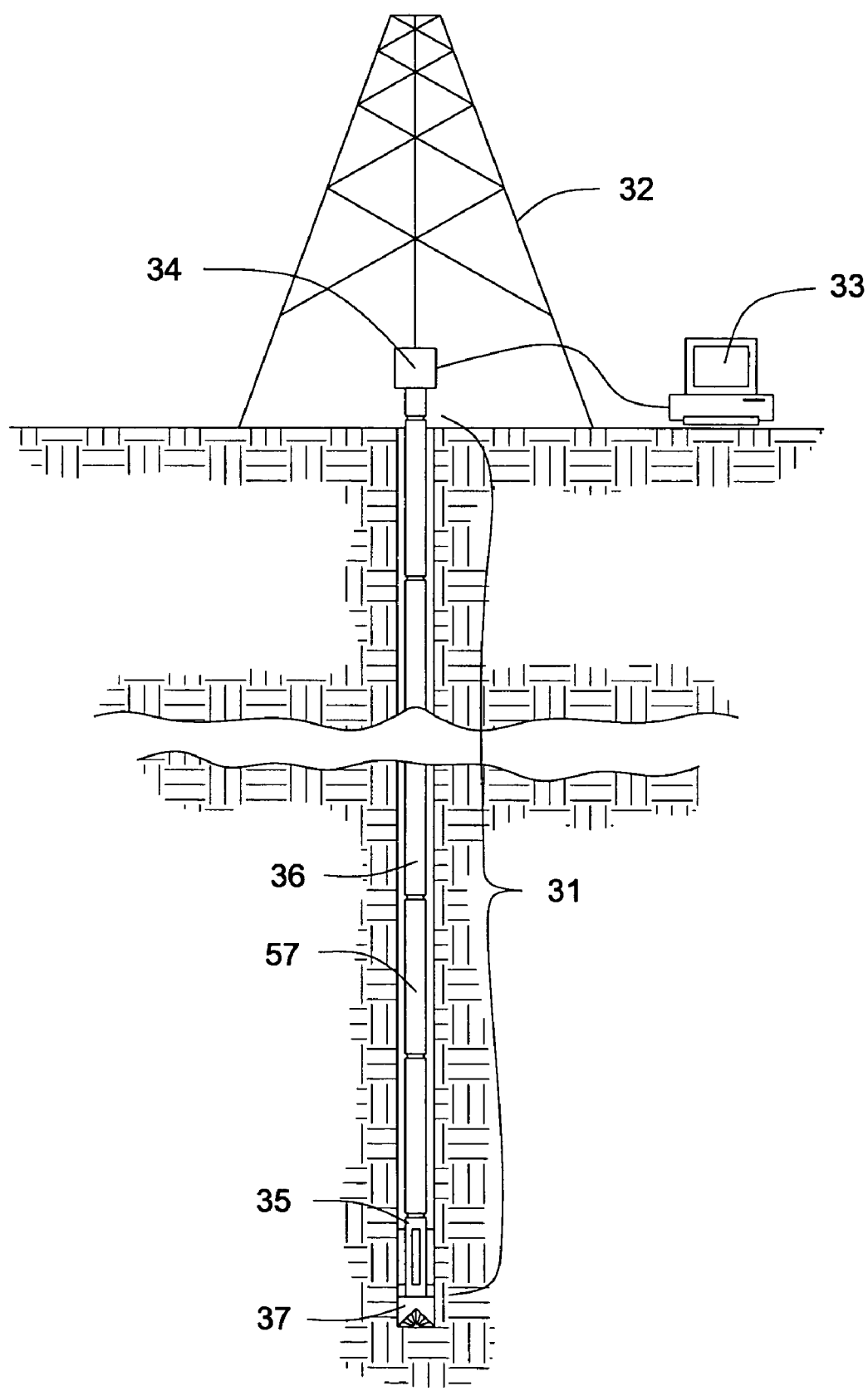
FIG. 1 is a cross sectional view of an embodiment of a downhole tool string.

FIG. 1 shows an embodiment of a downhole tool string 31 suspended in a well bore by a derrick 32. Surface equipment 33, such as a computer, connects to a data swivel 34. The data swivel 34 is adapted to transmit data to and from an integrated transmission network while the downhole tool string 31 is rotating. The integrated transmission network comprises the transmission systems of the individual components 35, 36, 57 of the downhole tool string 31. Preferably the downhole tool is a pipe 36, 57. Alternatively, the downhole component may be a tool 35. Tools 35 may be located in the bottom hole assembly 37 or along the length of the downhole tool string 31. Examples of tools 35 on a bottom hole assembly 37 comprise sensors, drill bits, motors, hammers, and steering elements. Examples of tools 35 located along the downhole tool string 31 are links, jars, seismic sources, seismic receivers, sensors, and other tools that aid in the operations of the downhole tool string 31. Different sensors are useful downhole such as pressure sensors, temperature sensors, inclinometers, thermocouplers, accelerometers, and imaging devices. Preferably the downhole tool string 31 is a drill string. In other embodiments the downhole tool string 31 is part of a production well.

Figure 2:
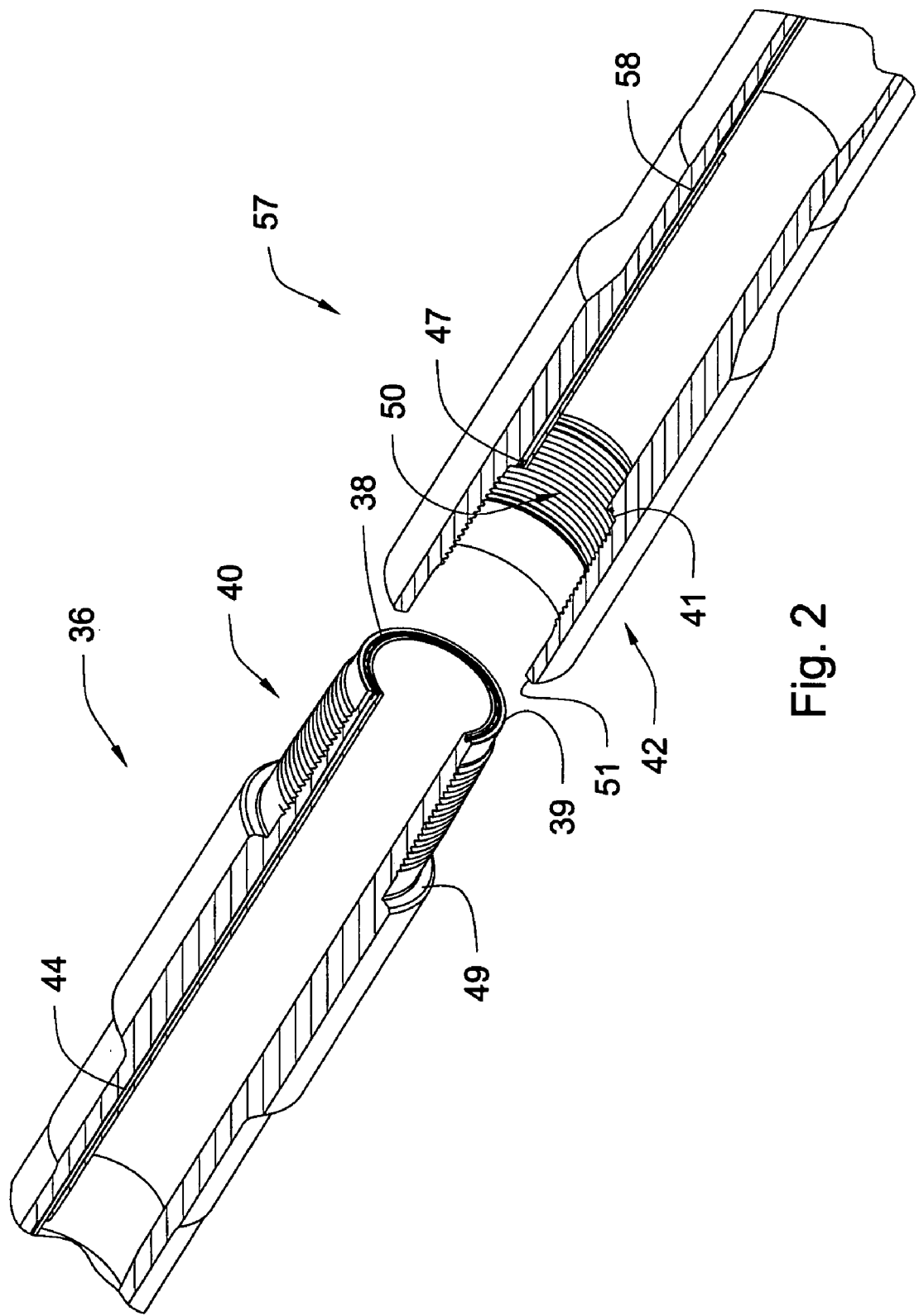
FIG. 2 is a perspective cross sectional view of an embodiment of downhole components.

The downhole tool string 31 is made up of components, as shown in FIG. 2. Preferably the components are pipes 36, 57 or some of the above mentioned tools 35. The components comprise data transmission elements 38, 47 located in the secondary shoulder 39 of the pin end 40 and the secondary shoulder 41 of the box end 42 of the downhole component 36, 57. Preferably, the transmission elements 38, 47 comprise an MCEI circular trough 46 (shown in FIG. 3), which is disposed in an annular groove formed in the secondary shoulders 39, 41. More preferably the annular grooved is formed by an annular housing 43. The annular housing 43 may be a metal ring. Preferably, the annular housing 43 is a steel ring. In other embodiments the annular housing 43 may be a stainless steel ring. The data transmission elements 38, 47 are connected by an electrical conductor 44. Preferably the electrical conductor 44 is a coaxial cable 96.

As shown, the MCEI circular trough 46 houses an electrically conductive coil 45. Preferably the MCEI trough is made from a single MCEI material, such as ferrite. The MCEI material may also be soft iron, nickel iron alloys, silicon iron alloys, cobalt iron alloys or mu-metals.

Alternatively, the MCEI trough may be of a combination of materials, such as a magnetizable element comprising a multi-laminar body. The element may comprise a plurality of ductile, generally U-shaped leaves that are electrically conductive. The leaves are less than about 0.0625" thick and are separated by an electrically insulating material. These leaves are aligned so as to form a generally circular trough. The permeable and ductile material may be associated with the class of soft magnetic materials.

The coil 45 may comprises at least two fractional loops 67, 70 of insulated wire. Preferably, the wire is made of copper and is insulated with a varnish, an enamel, or a polymer. When the components of the downhole tool string 31 are made up, the transmission elements 38, 47 line up adjacent to each other and allow data transmission between components 36, 57. A threaded portion 48 located between the primary shoulder 49 and secondary shoulder 39 of the pin end 40 and a threaded portion 50 located between the primary shoulder 51 and secondary shoulder 41 of the box end 42 provide a means of attachment for the downhole components 36, 57.

Figure 3:
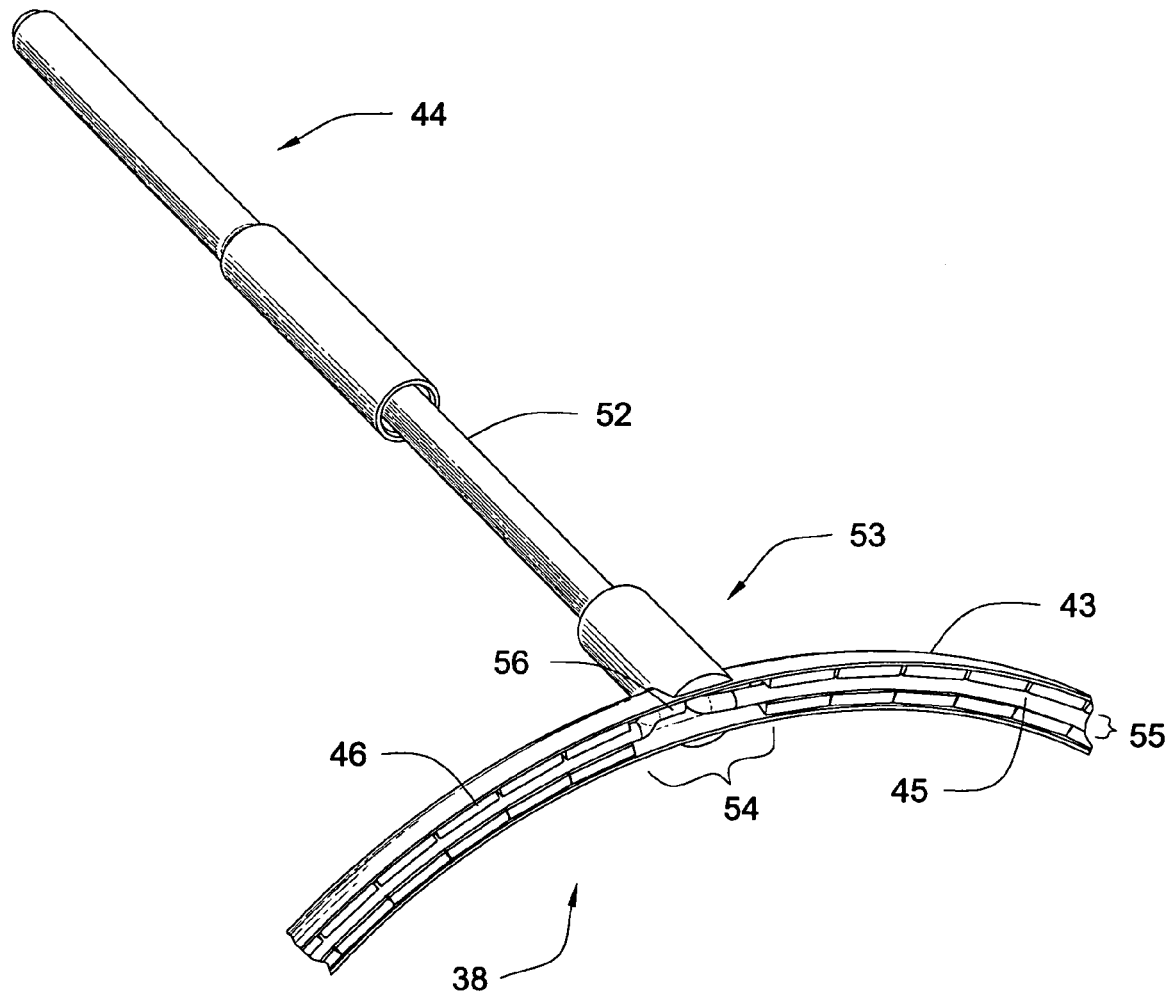
FIG. 3 is a perspective view of an embodiment of a transmission element.

FIG. 3 shows an embodiment of a connection between the electrical conductor 44 and the electrical conducting coil 45. In the preferred embodiment, a signal travels along the electrical conductor 44 of a downhole component 36. The signal passes from the electrical conductor 44 to a lead wire 52 of the coil 45. The transmission element 38 comprises an anti-rotation device 53, which keeps the annular housing 43 from rotating about the axis of the lead wire 52. In the preferred embodiment the lead wire 52 may enter the annular housing 43 through a hole in the annular housing 43, where there is a void 54 of the MCEI trough. The coil 45 is housed in a channel 55 formed by the MCEI circular trough 46.

Preferably, the fractional loops may be equal in length, for example: two half loops, three third loops, and four quarter loops. In the preferred embodiment, the coil comprises two half loops. Alternatively, the fractional loops may be different lengths, for example: one half loop combined with two quarter loops, and one third loop combined with one three quarter loop.

In the preferred embodiment, a connecting cable 66 times the arrival of the electrical signals to the fractional loops of the coil 45. In the preferred embodiment a first fractional loop 67 extends half way around the channel 55 where it make a first contact 69 with the connecting cable 66 which leads to ground. The connecting cable 66 makes a second contact 68 with the first fractional loop 67 where the lead wire 52 enters the annular housing 43. The second contact 68 creates a second signal, which is passed along the connecting cable 66. The second signal arrives at a second fractional loop 70 approximately at the same time as the first signal arrives at the first contact 69. It believed that approximately as the first signal leaves the channel 55, the second signal enters the channel 55 and the coil 45 experiences a continuous circuit. The second fractional loop 70 is preferably grounded to the annular housing 43 in the void 54 in the MCEI trough. In the preferred embodiment, the grounded portion 56 of the coil 45 is brazed to the annular housing 43. In some embodiments of the present invention the coil 45 and MCEI circular trough 46 are disposed in a groove formed by the secondary shoulders 39, 41 of both the pin end 40 and also of the box end 42 of the downhole component 36.

As the signal travels along the fractional loops 67, 70 of the coil 45, the magnetic field from the electrical current is magnified by the MCEI trough. The magnified magnetic field influences the MCEI trough in the adjacent transmission element 47 in the adjacent downhole component 57. Preferably, the electrically conducting coils are arranged in a manner to allow the magnetic fields to generate a magnetic transmission circuit. A magnetic transmission circuit may be allowed by disposing one coil in a clockwise direction in the MCEI circular trough 46 and disposing an adjacent coil in a counterclockwise direction in an adjacent segmented circular trough 46 of MCEI trough. The coil in the adjacent transmission element 47 is influenced by the magnetic transmission circuit to generate an electrical current and that signal is passed to the electrical conductor 58 in the adjacent downhole component 57. It is believed that the fractional loops 67, 70 reduce the inductance of the electrically conducting coil 45. It is further believed that the reduced inductance reduces impedance reflections; therefore, the reduced inductance reduces signal loss and attenuation.

Figure 4:
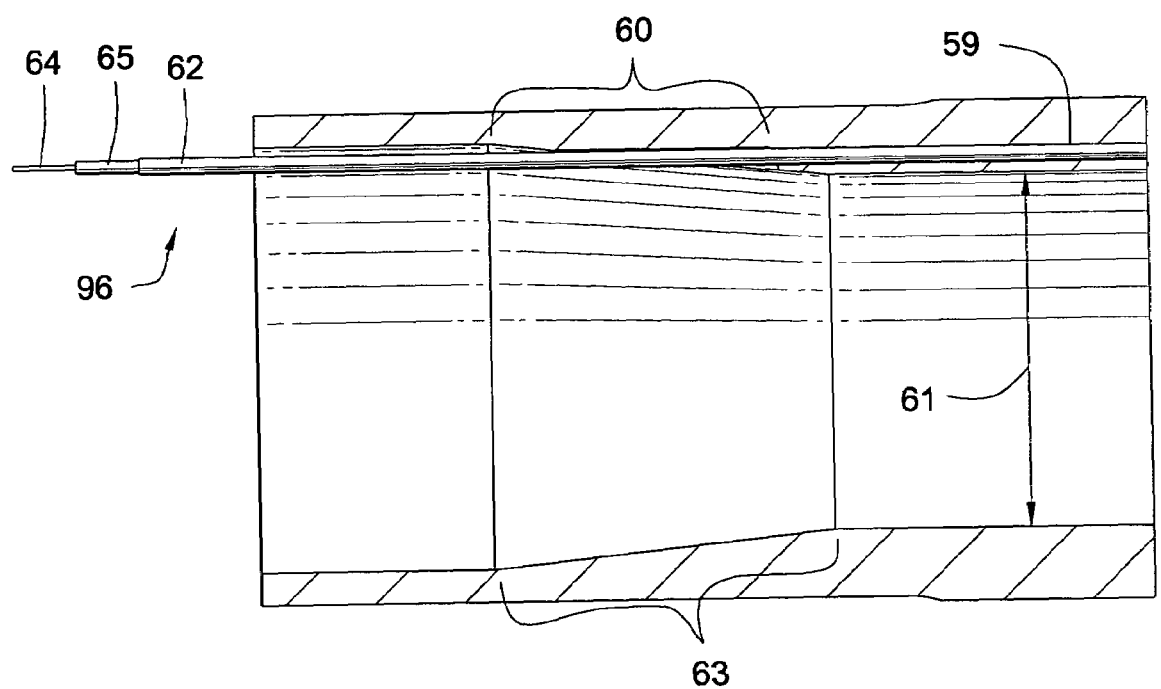
FIG. 4 is a cross sectional view of an embodiment of a downhole component.

In the preferred embodiment, a passage 59 is formed in the component 36 for the electrical conductor 44 and lead wire 52. Preferably the passage 59 runs from the secondary shoulder 39 to an opening 60 in the inner diameter 61 of the downhole component 36. The passage 59 may be a drilled hole. FIG. 4 shows an embodiment of the coaxial cable 96 disposed inside the downhole component 36. In the preferred embodiment the inner diameter 61 of the downhole component 61 narrows at the ends of the component 36. The coaxial cable 96 exits the passage 59 through the opening 60 in the region 63 where the inner diameter 61 of the component 36 narrows. The coaxial cable comprises a conductive core 64, and dielectric 65, and a conductive shield 62.

Figure 5:
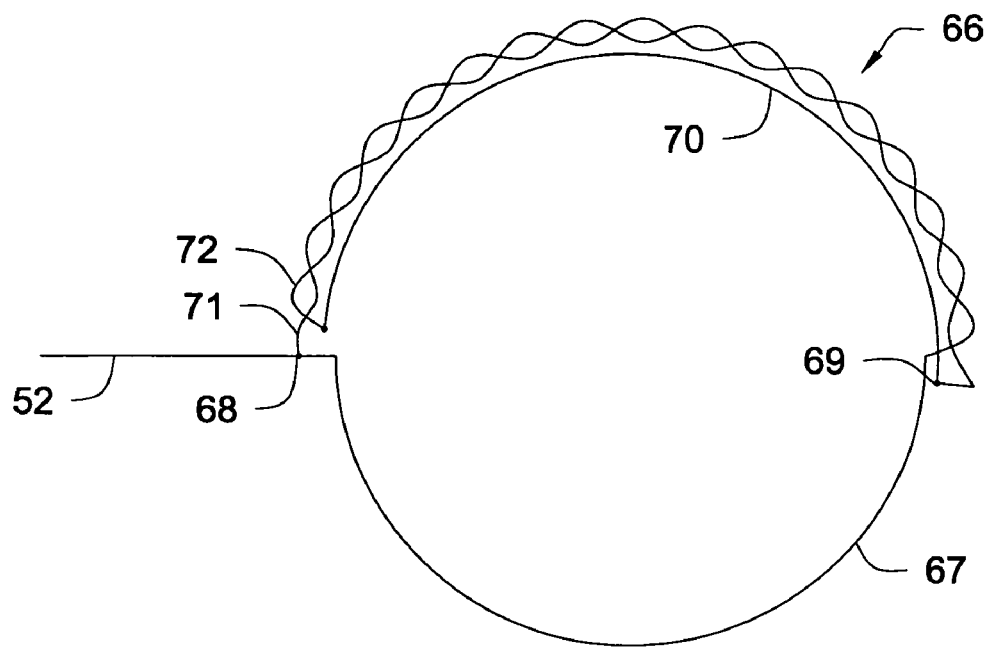
FIG. 5 is an orthogonal view of an embodiment of a coil.

FIG. 5 shows an embodiment of a coil 45. Preferably, the connecting cable 66 is approximately the same length as the fractional loops 67, 70. More preferably, the electrical characteristics of the connecting cable 66 are similar to the electrical characteristics of the fractional loops 67, 70. It is believed that a connecting cable 66 of similar length and similar electrical characteristics to the fractional loops 67, 70 may carry signals at the same velocity. In certain embodiments of this invention, the electrical characteristics and the length of the connecting cable 66 and the fractional loops 67, 70 are different, but they are arranged such that as the first signal passes out of the channel 55, the second signal passes into the channel 55. It is also preferred that the fractional loops 67, 70 are approximately equal in length and have similar electrical characteristics.

Figure 6:
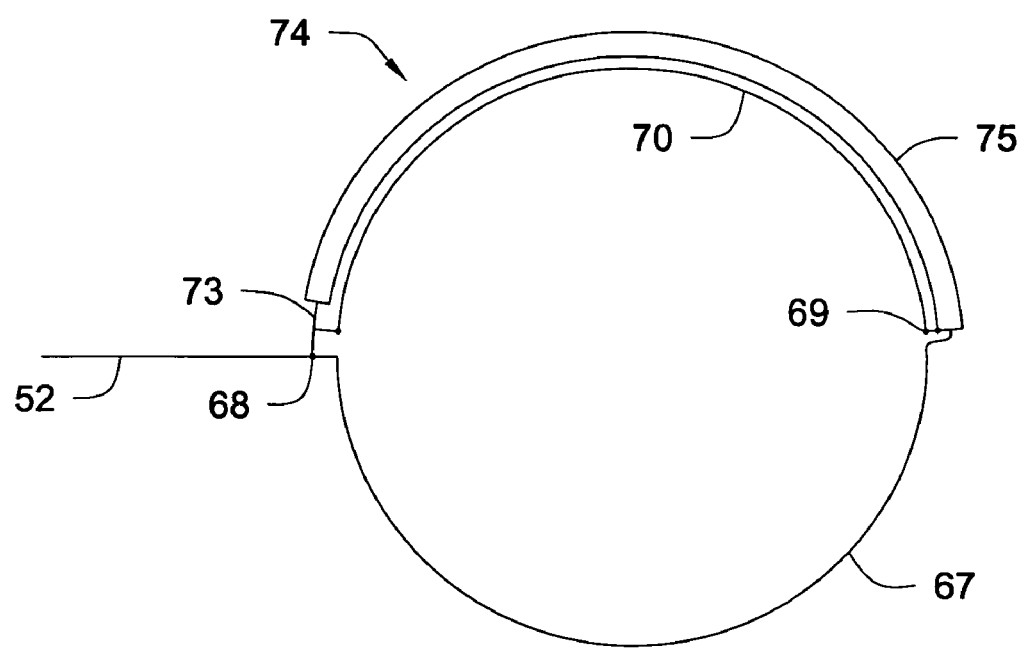
FIG. 6 is an orthogonal view of an embodiment of a coil.
Figure 7:
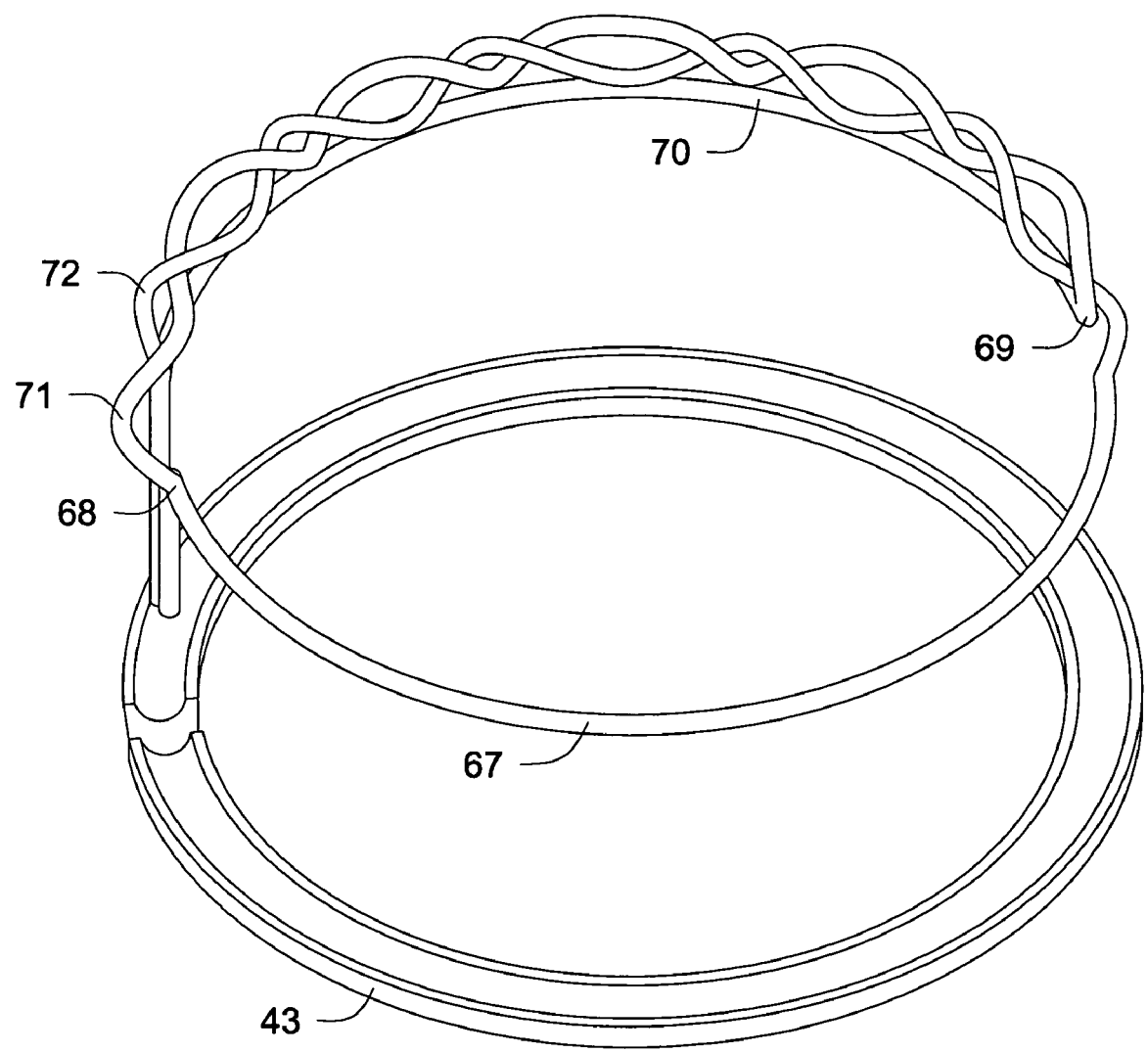
FIG. 7 is a perspective view of an embodiment of a coil.

The connecting cable 66 may a pair of twisted wires 71, 72. The connecting cable 66 may alternatively be a shielded pair 79 of twisted wires 71, 72. In another aspect of the present invention, the connecting cable 66 is a coaxial cable 74. Alternatively, the connecting cable 66 is a triaxial cable 80. In another aspect of the present invention, the connecting cable 66 is shielded twin axial cable 81. FIG. 5 shows an embodiment of a pair of twisted wires 71, 72 as the connecting cable 66. Wire 71 makes the second contact 68 and wire 72 make the first contact 69. It is believed that the electromagnetic influence of wire 71 is cancelled out by the opposite electromagnetic influence of wire 70 and vice versa. It is believed that a shielded pair 79 of twisted wires 71, 72 may provide a shielding effect of any electromagnetic influences of wires 71, 72. FIG. 6 shows an embodiment of a connecting cable 66 comprising a coaxial cable 74. The inner core 73 of the coaxial cable 74 may make the second contact 68 and the outer shield 75 of the coaxial cable 74 may make the first contact 69. It is believed that the inner core 73 cancels out the opposite electromagnetic influences of the outer shield 75 and vice versa. It is believed that a triaxial cable 80 may provide a shielding of any electromagnetic influences of inner core 73 and the outer shield 75. FIG. 7 shows a perspective view of a coil 45.

In FIGS. 5, 6, and 7 the fractional loops 67, 70 are half of a full loop. It is believed that the half loops have half the inductance that a full loop may have. It is believed that the fraction of inductance of a coil with fractional loops of equal distance may be determined in relation to a full loop coil by the following equation: $L=1/n^2$., wherein L represents inductance and n is the number of fractional loops. According to the equation, a coil 45 comprising two half loops 67, 70 would have ¼ the inductance. A coil 45 with three equal fractional loops would have ⅑ the inductance. A coil 45 with four equal fractional loops 82, 83, 84, 85 (shown in FIG. 8) would have 1/16 the inductance. It is believed that the reduced inductance is made up in the reduced impedance reflections, which is believed to cause signal loss and attenuation.

Figure 8:
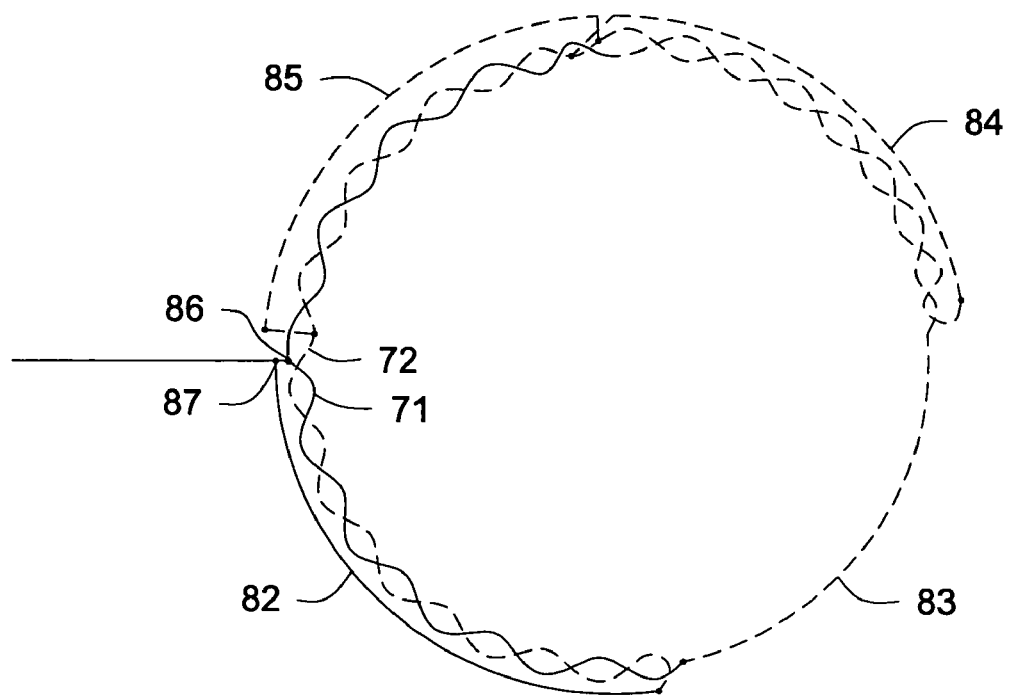
FIG. 8 is an orthogonal view of an embodiment of a coil.
Figure 9:
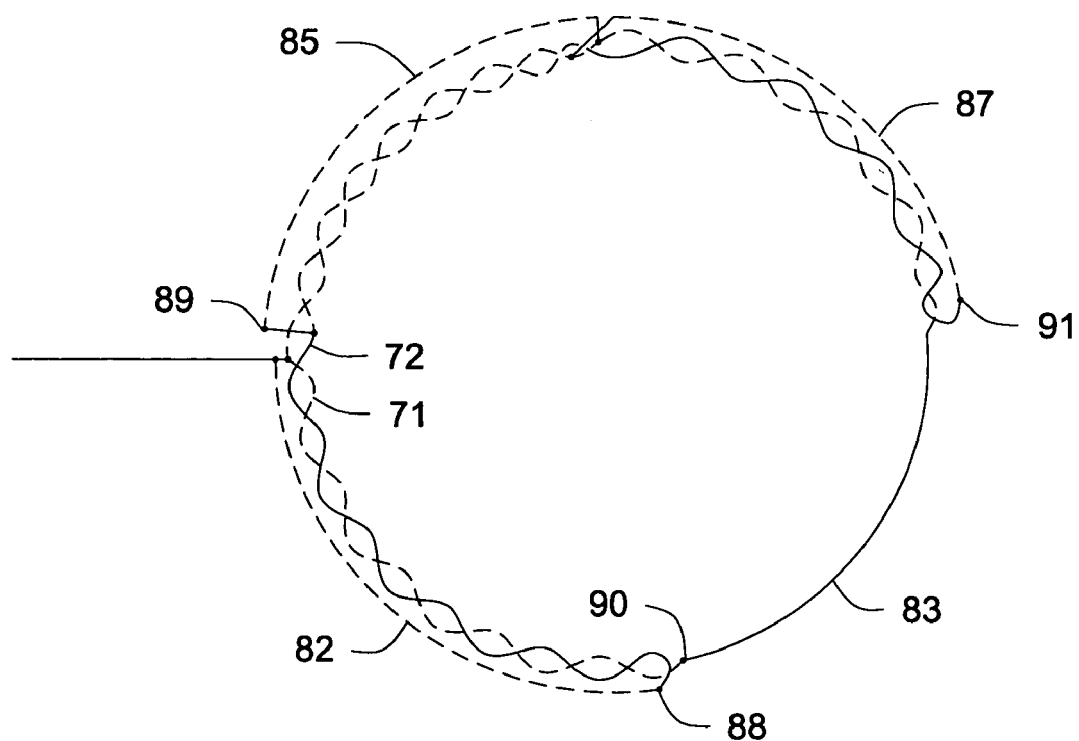
FIG. 9 is an orthogonal view of an embodiment of a coil.
Figure 10:
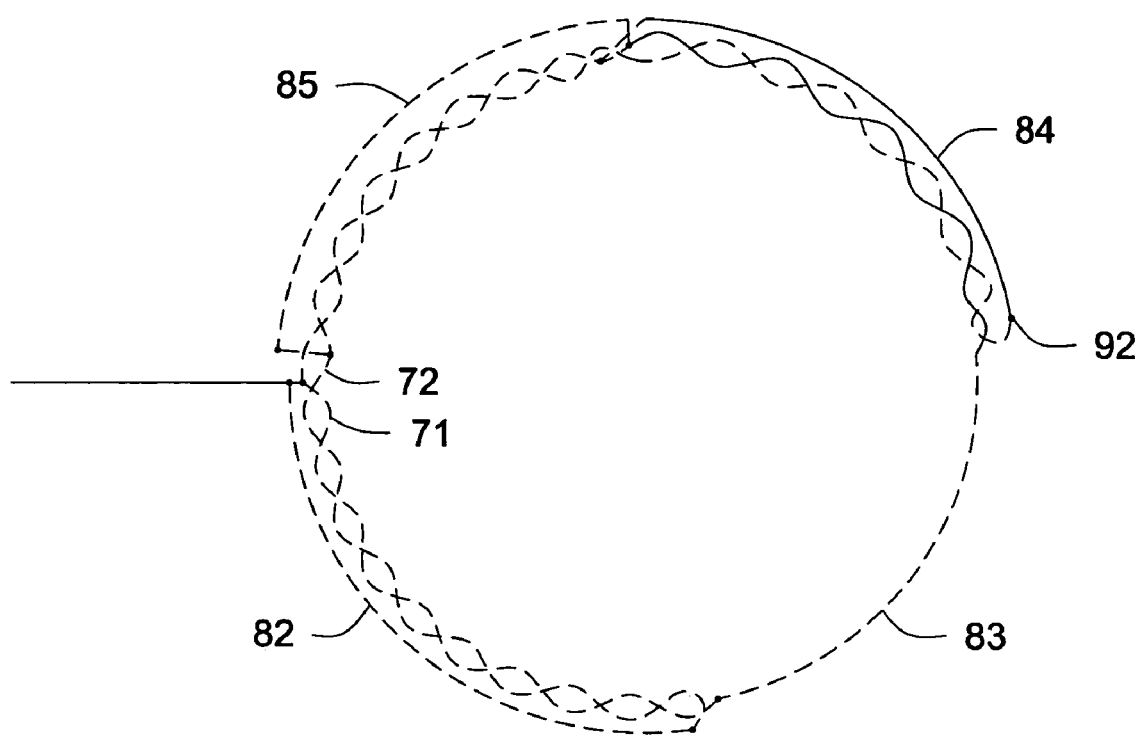
FIG. 10 is an orthogonal view of an embodiment of a coil.
Figure 11:
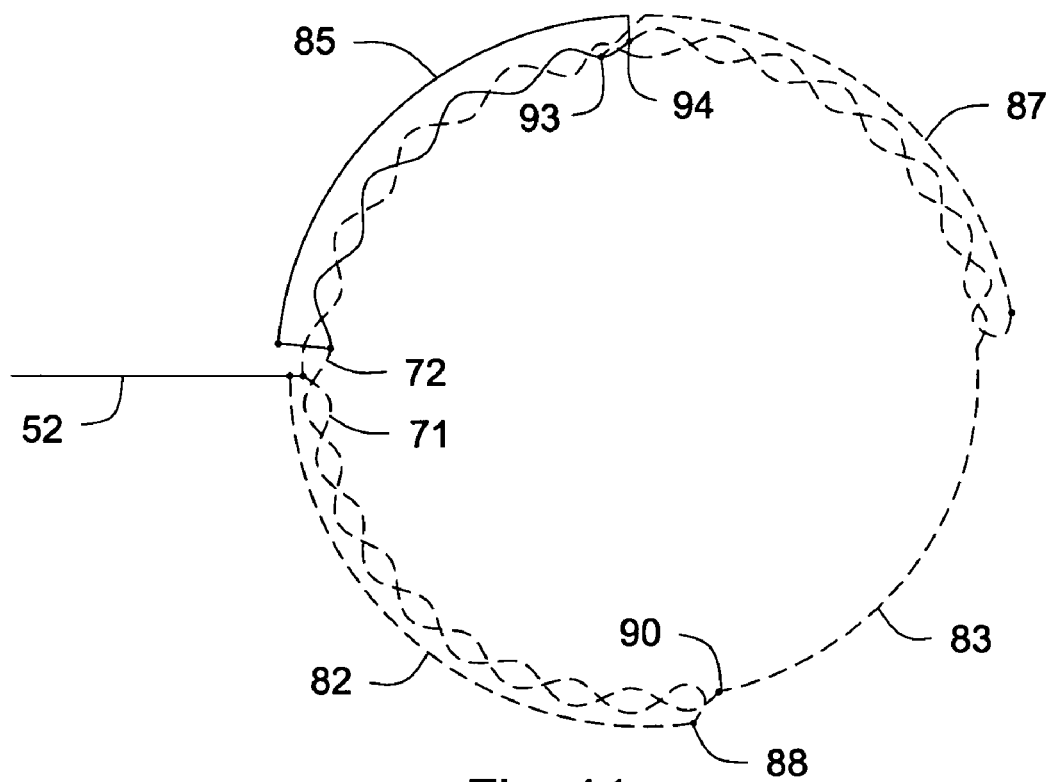
FIG. 11 is an orthogonal view of an embodiment of a coil.

An embodiment of a coil 45 with four fractional loops 82, 83, 84, 85 of equal length is shown in FIGS. 8, 9, 10, 11, and 12. A pair of twisted wires 71, 72 is used as the connecting cable 66. The lead wire 52 makes a first contact 86 with the first fractional loop 82 and a second contact 87 with wire 71. FIG. 8 highlights the pathways for the three signals produced during a first interval of time. FIG. 9 shows the pathway for the three signals during a second interval. The signal traveling on the first fractional loop 82 makes a contact 88 with wire 72 and then travels to ground 89. The a first signal on wire 71 make a contact 90 with the second fractional loop 83. A second signal on wire 71 continues to travel to a contact 91 with the third fractional loop 84. FIG. 10 shows the contact 91 between the third fractional loop 83 and wire 71, which the signal passes during a third interval. The second fractional loop 83 makes a contact 92 with wire 72. FIG. 11 shows a fourth interval of time. One signal passes from the third fractional loop to wire 72 at contact 93, and the signal travels to ground 89. A signal from wire 72 travels to the fourth fractional loop 85 at contact 94 and that signal travels to ground 89. The three signals allow the coil 45 to experience a continuous circuit with approximately no time interruptions. Further the four fractional loops 82, 83, 84, 85 reduce to the inductance of the coil 45 and may improve impedance matching between a transmission element 38 to an adjacent transmission element 47 or between the coil 45 and the electrical conductor 44.

Figure 12:
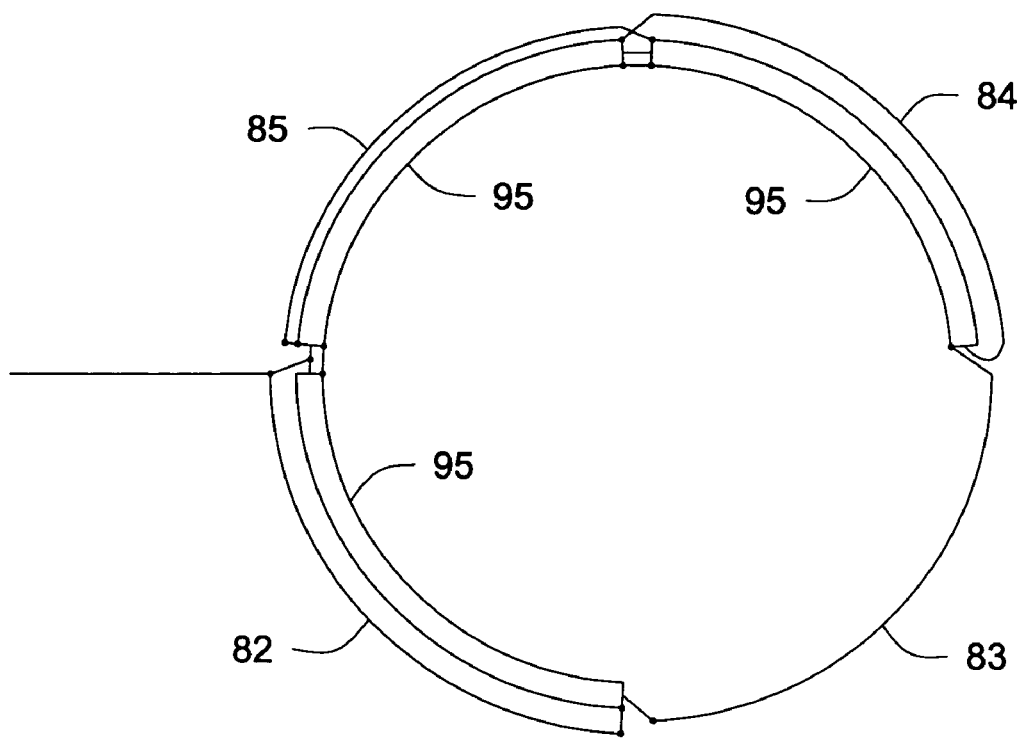
FIG. 12 is an orthogonal view of an embodiment of a coil.

FIG. 12 shows another embodiment of four fractional loops 82, 83, 84, 85 of equal length. The connecting cable 66 comprises three segments 95 of coaxial cable 74.

Figure 13:
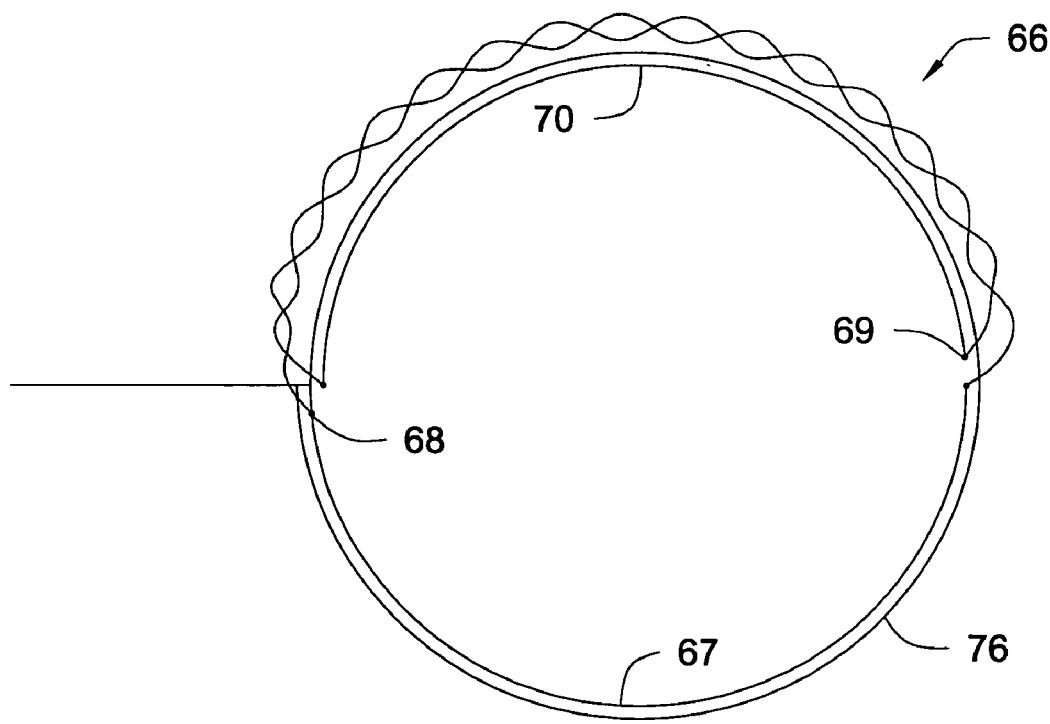
FIG. 13 is an orthogonal view of an embodiment of a coil.

FIG. 13 shows an embodiment of a coil 45 with a full loop 76, a first fractional loop 67, and a second fractional loop 70. In this embodiment the connecting cable 66 makes a first contact 68 and a second contact 69. The signal enters through the hole in the annular housing 43 and travels around the segmented circular trough 46 forming a full loop 76. The first contact 68 is located at the end of the full loop 67 where a second signal travels up the connecting cable 66. The first signal travels along the first fractional loop 67 as the second signal travels along the connecting cable 66. The first signal reaches the second contact 68 and the signal goes to ground at the same time that the second signal reaches the second fractional loop 70.

Figure 14:
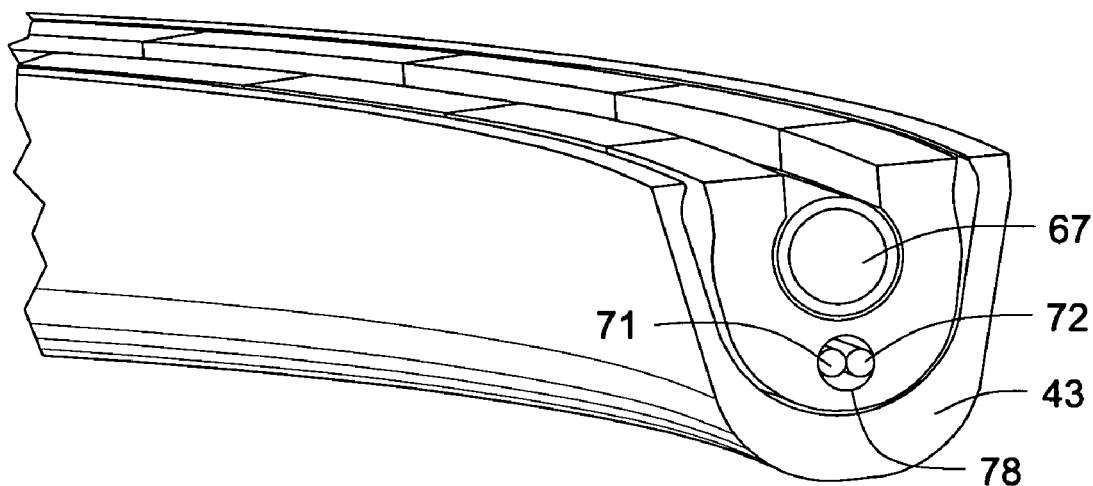
FIG. 14 is a perspective cross sectional view of an embodiment of a coil.
Figure 15:
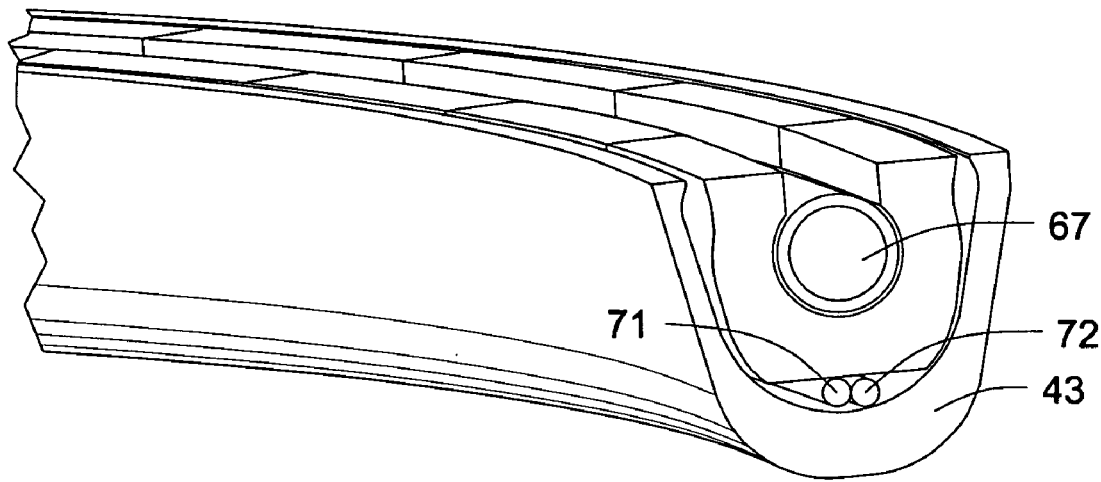
FIG. 15 is a perspective cross sectional view of an embodiment of a coil.

FIGS. 14-23 show fractional perspective views of the coil 45 and the connecting cable 66 fitted in the MCEI circular trough 46. FIG. 14 shows a hole 78 located in the MCEI trough, where a pair of twisted wires 71, 72 runs. It is believed that in this embodiment the electromagnetic influences of the pair of twisted wires 71, 72 are cancelled out by each other and will provide a minimal affect on the MCEI trough. The connecting cable 66 may be located below the MCEI trough; an embodiment is shown in FIG. 15. In this embodiment, a gap 100 between the MCEI trough and the annular housing 43 is formed to make room for connecting cable 66. It is believed that the gap 100 has a minimal impact on the magnetic transmission circuit.

Figure 16:
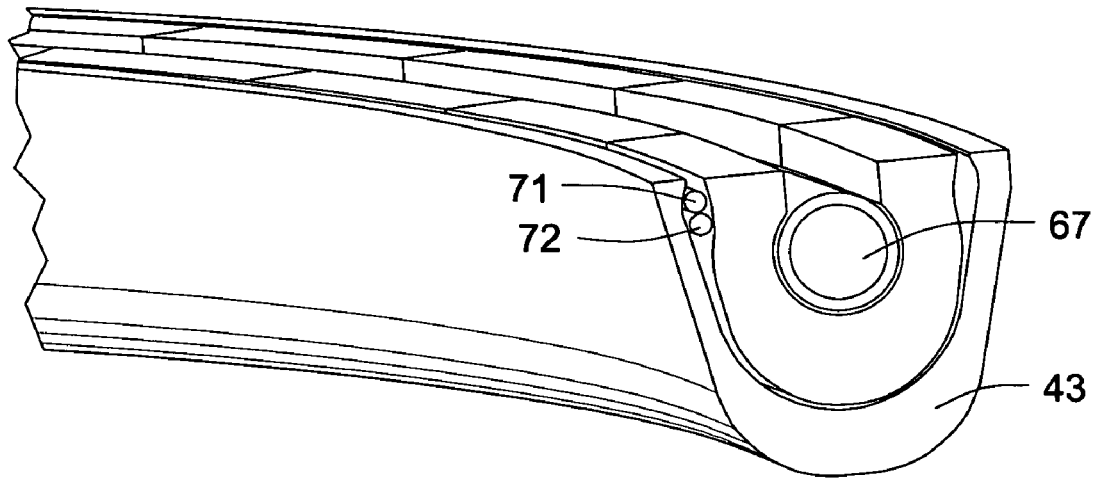
FIG. 16 is a perspective cross sectional view of an embodiment of a coil.
Figure 17:
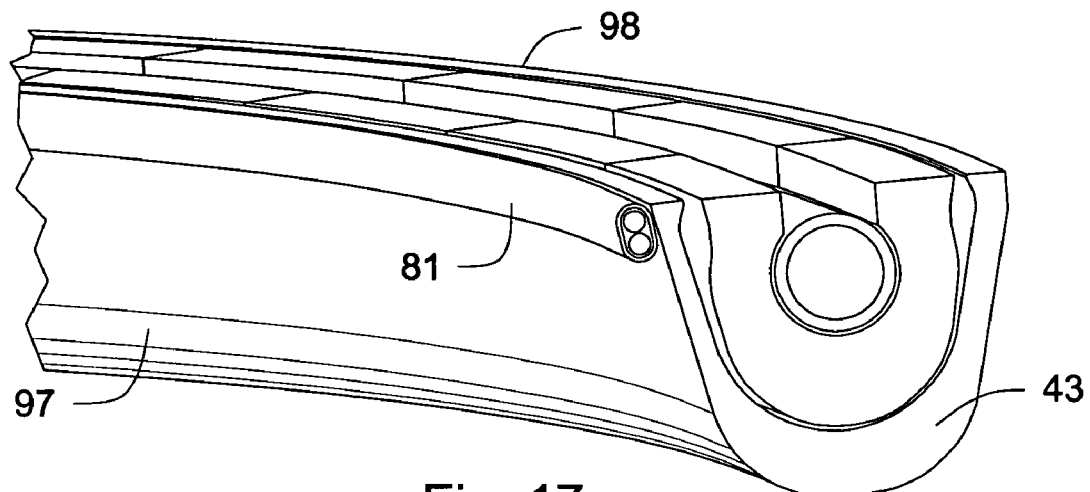
FIG. 17 is a perspective cross sectional view of an embodiment of a coil.
Figure 18:
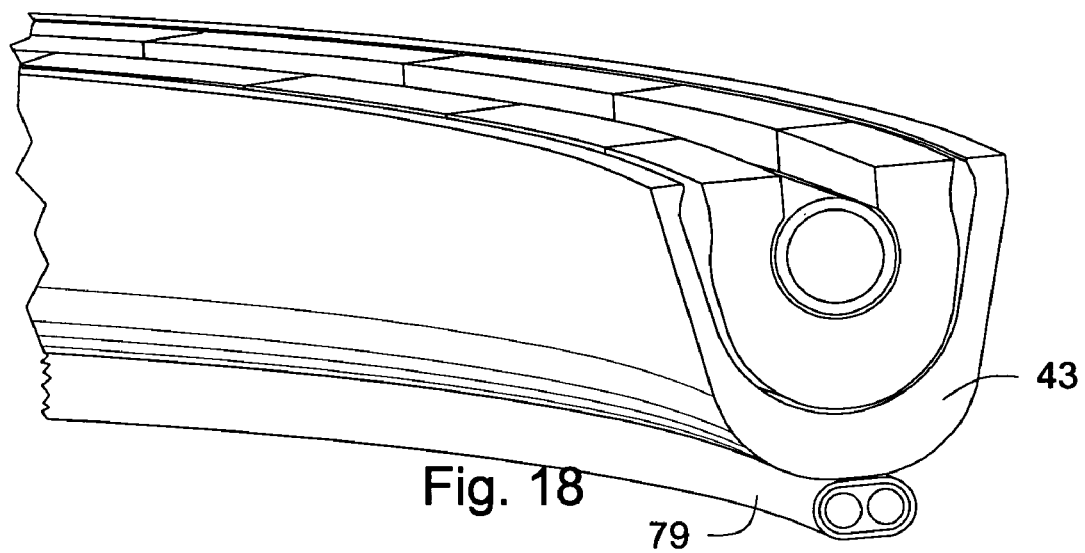
FIG. 18 is a perspective cross sectional view of an embodiment of a coil.

FIG. 16 shows an embodiment of a connecting cable 66 located between the annular housing 43 and the MCEI trough. In another aspect of the present invention, the connecting cable 66 is located outside the annular housing 43; an embodiment is shown in FIG. 17. In this embodiment the connecting cable 66 is heavily shielded from the MCEI trough. A niche may be removed from the annular groove formed in the downhole component 36 where the annular housing 43 resides to make room for the connecting cable 66. In some embodiments, the connecting cable 66 is located outside of the inner diameter 97 of the annular housing 43. It is believed that this embodiment is advantageous, because a shorter connecting cable 66 may be used. In other embodiments the connecting cable 66 is located outside the outer diameter 98 of the annular housing 43. FIG. 18 shows another embodiment of a connecting cable 66 located below the annular housing 43. This embodiment is believed to be advantageous because the niche may be removed under the annular housing 43. In some embodiments the connecting cable 66 may be used to help bias the transmission element 38 up and provide better contact with an adjacent transmission element 47.

Figure 19:
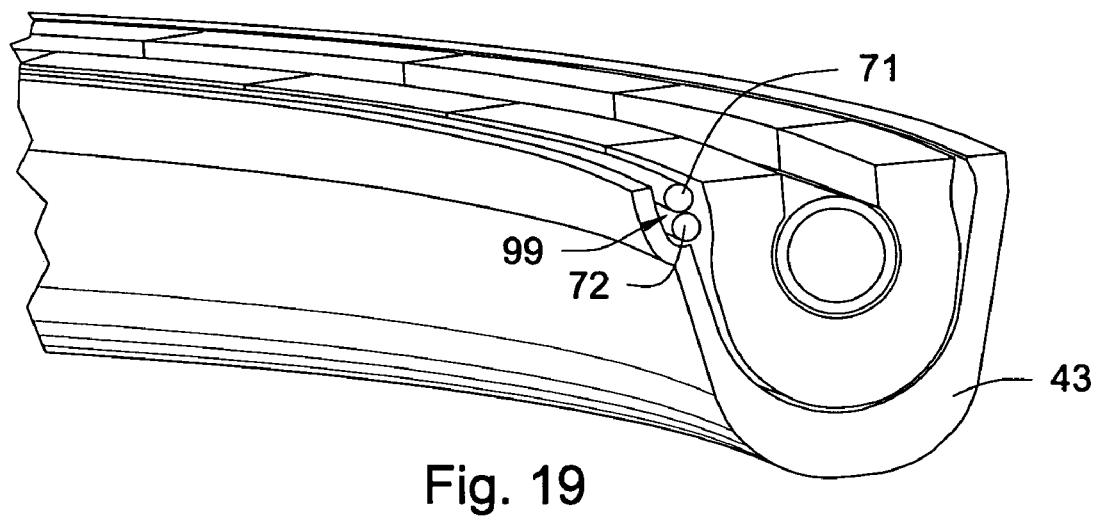
FIG. 19 is a perspective cross sectional view of an embodiment of a coil.
Figure 20:
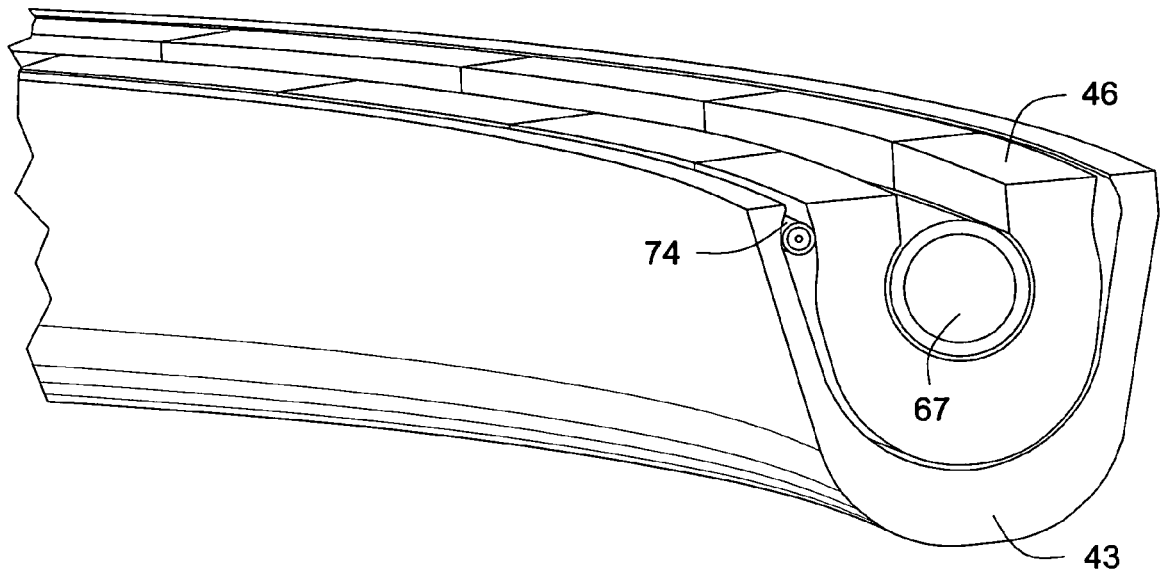
FIG. 20 is a perspective cross sectional view of an embodiment of a coil.
Figure 21:
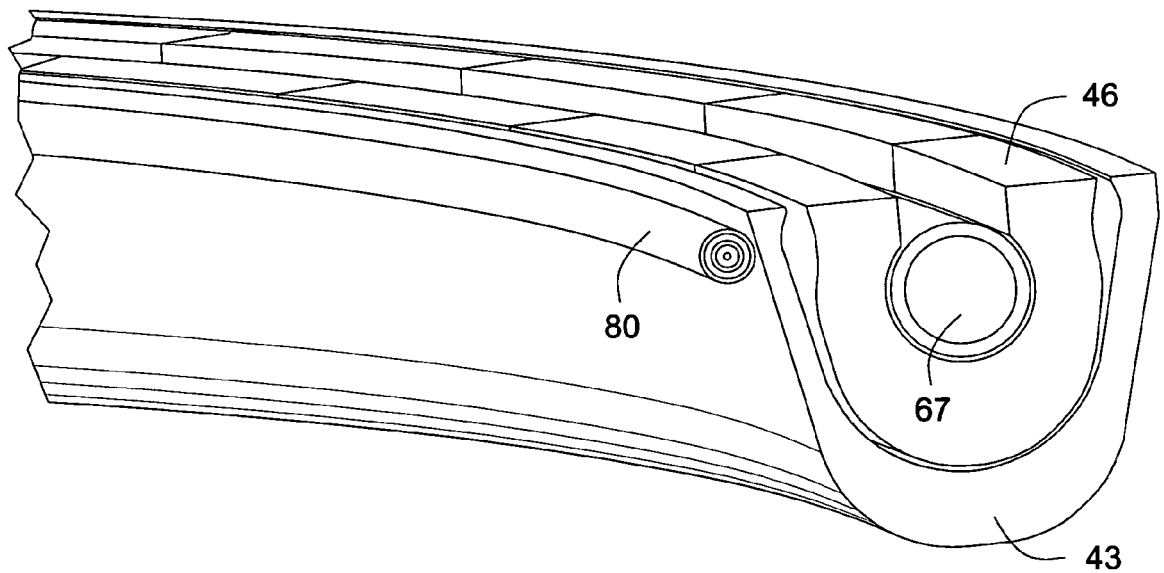
FIG. 21 is a perspective cross sectional view of an embodiment of a coil.

In another aspect of the invention, a bend 99 is made in the annular housing 43 to provide a place for the connecting cable 66; an embodiment is shown in FIG. 19. FIGS. 20 and 21 show similar embodiments to the embodiments shown in FIGS. 16 and 17, wherein the connecting cable 66 is a coaxial cable 74.

Figure 22:
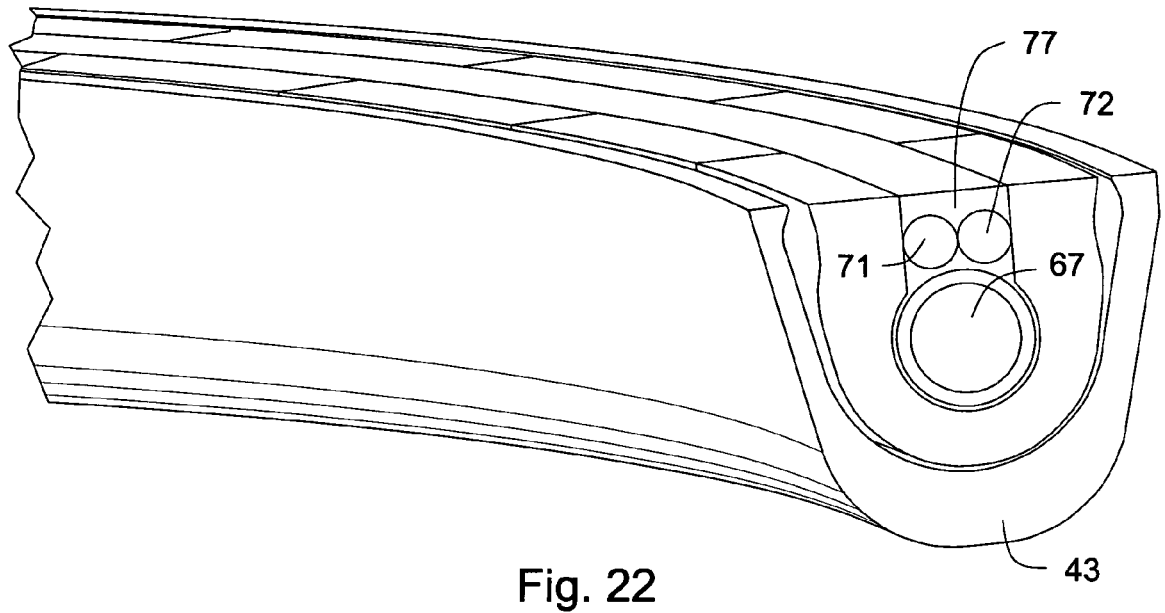
FIG. 22 is a perspective cross sectional view of an embodiment of a coil.
Figure 23:
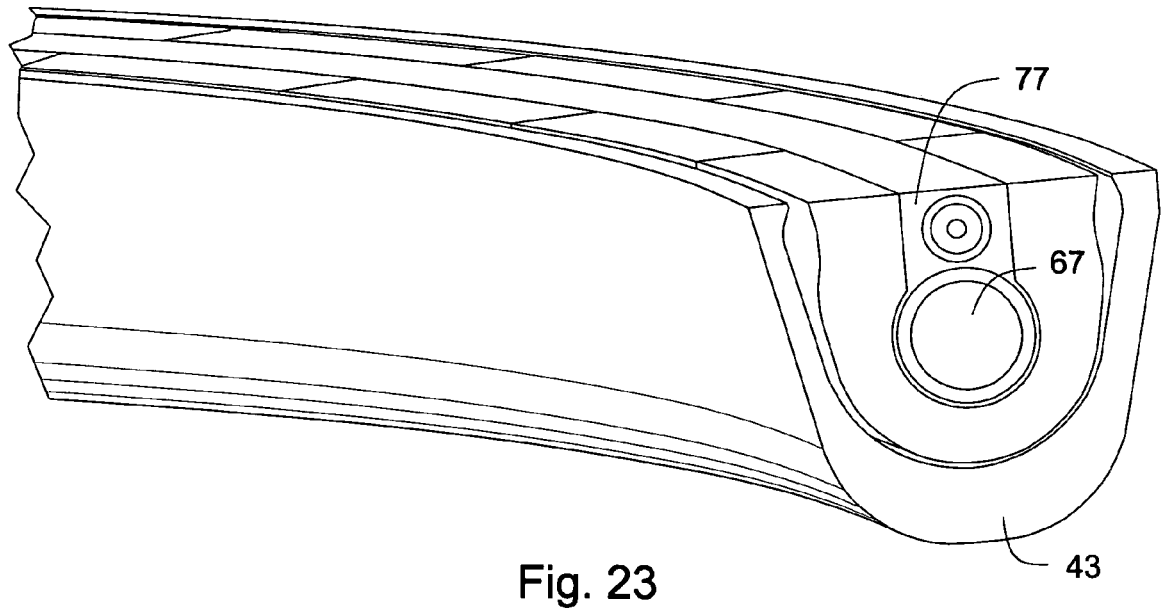
FIG. 23 is a perspective cross sectional view of an embodiment of a coil.

FIGS. 22 and 23 show embodiments of the connecting cable 66 located in the channel 55 with a fractional loop 67. An electrically insulating filler material 77 fills the space around the connecting cable 66 and the coil 45 in the channel 55. The filler material 77 helps to isolate the electrical influences of the connecting cable 66. It is important that the electromagnetic influences of the connecting cable 66 are isolated so it does not create a magnetic field that may adversely affect the magnetic transmission circuit. Preferably, the filler material 77 is selected from a group consisting of epoxy, natural rubber, fiberglass, carbon fiber composite, a polymer, polyurethane, silicon, a fluorinated polymer, grease, polytetraflouoethyene and perfluoroalkoxy, or a combination thereof.

The description above and the attached figures are meant to illustrate specific embodiments of the present invention and not limit its scope. Those having ordinary skill in the art will appreciate that other embodiments will fall within the scope and spirit of the invention as defined in the appended claims.

The invention claimed is:

1. A transmission system in a downhole component, comprising: a data transmission element in both ends of the downhole component, each data transmission element housing an electrically conducting coil lying within a MCEI circular trough; wherein the electrically conducting coil comprises at least two generally fractional loops wherein the transmission elements are connected by an electrical conductor.

2. The transmission system according to claim 1, wherein the loops are wires.

3. The transmission system according to claim 1, wherein the loops are insulated wires.

4. The transmission system according to claim 1, wherein the MCEI trough comprises ferrite.

5. The transmission system according to claim 1, wherein the fractional loops are connected by a connecting cable.

6. The transmission system according to claim 5, wherein the connecting cable is selected from the group consisting of a pair of twisted wires, a shielded pair of twisted wires, a coaxial cable, a triaxial cable, and a shielded twin axial cable.

7. The transmission system according to claim 5, wherein the connecting cable is grounded.

8. The transmission system according to claim 5, wherein the connecting cable is disposed in a hole in the MCEI circular trough.

9. The transmission system according to claim 5, wherein the connecting cable is disposed outside the MCEI circular trough.

10. The transmission system according to claim 5, wherein the connecting cable is disposed in a channel formed in the MCEI circular trough.

11. The transmission system according to claim 5, wherein the connecting cable is disposed outside an annular housing, which houses the MCEI circular trough.

12. A transmission system in a downhole component, comprising: an electrical conductor connecting data transmission elements in both ends of the downhole component, each data transmission element housing an electrically conducting coil lying within a MCEI circular trough; wherein the electrically conducting coil comprises at least two generally fractional loops in communication with each other via a connecting cable.

13. The transmission system according to claim 12, wherein the loops are insulated wires.

14. The transmission system according to claim 12, wherein the MCEI trough comprises ferrite.

15. The transmission system according to claim 12, wherein the connecting cable is a pair of twisted wires.

16. The transmission system according to claim 12, wherein the connecting cable is a coaxial cable.

17. The transmission system according to claim 12, wherein the connecting cable is disposed in a hole in the MCEI circular trough.

18. The transmission system according to claim 12, wherein the connecting cable is disposed outside the MCEI circular trough.

19. The transmission system according to claim 12, wherein the connecting cable is disposed in a channel formed in the MCEI circular trough.

20. A transmission system in a downhole component, comprising: an electrical conductor connecting data transmission elements in both ends of the downhole component, each data transmission element housing an electrically conducting coil lying within a MCEI circular trough; wherein the electrically conducting coil comprises at least two half loops in communication with each other via a pair of twisted wires disposed in a hole in the MCEI circular trough.

21. The transmission system according to claim 20, wherein the MCEI trough comprises ferrite.

* * * * *